May 12, 1931. A. ABRAHAMS 1,804,391
FISH LURE
Filed Aug. 26, 1929
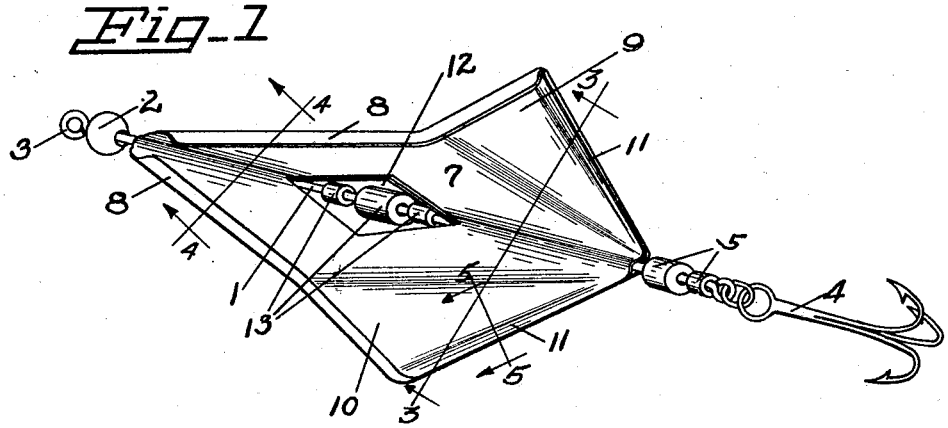
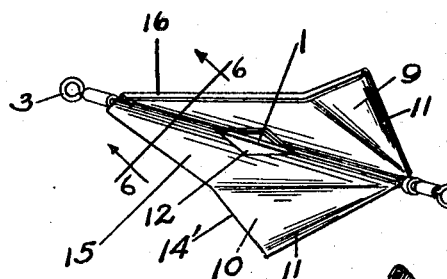
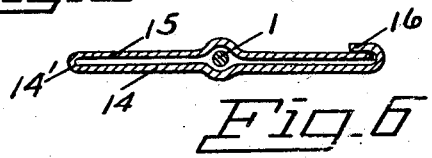
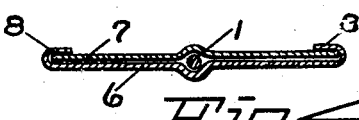
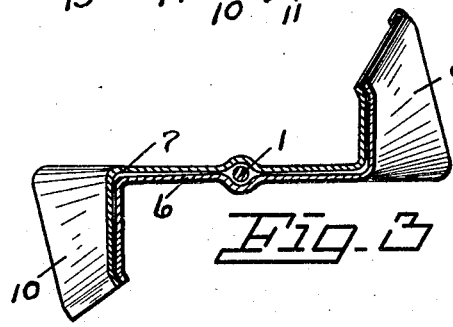
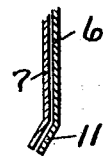
ALBIN ABRAHAMS
Inventor
By Herbert E. Smith
Attorney Patented May 12, 1931

1,804,391

UNITED STATES PATENT OFFICE

ALBIN ABRAHAMS, OF SPOKANE, WASHINGTON

FISH LURE

Application filed August 26, 1929. Serial No. 388,298.

My present invention relates to improvements in fish lures of the revolving type, which when drawn through the water, are caused to spin for the purpose of more readily attracting the attention of the fish. In carrying out my invention I provide a metal lure of double thickness to insure a light, but strong spinner, and the latter is fashioned with opposed blade flanges to increase the spinning action of the lure.

Means are also provided whereby the lure is fashioned with sides that contrast in color, to further enhance the effect of the lure.

The invention consists in certain novel combinations and arrangements of parts in the structure of the lure as will hereinafter be more fully set forth and claimed. In the accompanying drawings I have illustrated one complete example of the physical embodiment of my invention wherein the parts are combined and arranged according to the best mode I have thus far devised for the practical application of the principles of my invention. A slightly modified form of the invention is also illustrated in the drawings to indicate that I contemplate changes and alterations in the exemplified showing, within the scope of my claims, without departing from the spirit of my invention.

Figure 1 is a perspective view of a lure embodying the preferred form of my invention.

Figure 2 is a perspective view of a modified form of the device.

Figure 3 is an enlarged detail sectional view at line 3—3 of Figure 1.

Figure 4 is a sectional detail view at line 4—4 of Figure 1.

Figure 5 is an enlarged detail view of the edge construction at line 5—5 of Figure 1.

Figure 6 is a sectional view at line 6—6 of Figure 2.

In carrying out my invention I utilize the conventional diamond shape of lure or spinner that is fashioned about the usual longitudinally extending stem or rod 1 having the forward ball 2 and attaching ring 3. At the rear end of the stem the usual hook 4 and the beads 5 are carried.

To provide a light but strong spinner I utilize two thicknesses or layers of sheet metal in the construction of the spinner, and as shown in Figures 1, 3 and 4, two plates, as the base plate 6 and the top plate 7 are employed. To provide a contrast in color and to enhance the appearance of the lure, the base plate may be of copper and the top plate of aluminum, both of which take a high polish, and it will be apparent that as the spinner revolves on the stem, (as the lure is drawn through the water) the alternating copper and white colors assure a means of attracting the fish.

These two plates are secured together at their edges by means of overturned flanges 8 on the base plate that embrace the edges of the top plate and the device is passed through suitable presses or other machines used for accomplishing this purpose.

The rear portion of the spinner is fashioned with a pair of opposed blades 9 and 10, fashioned and shaped in such manner as to cause rotation of the spinner on its longitudinal axis, which of course is the stem 1. As shown in Figure 3, the blades are turned up at right angles to, or perpendicular to, the body of the lure or spinner, and disposed with relation to the body of the spinner in such manner as to perform the functions of a screw thread and revolve the spinner. To further increase the spinning action the rear converging edges of the spinner-blades are slightly upset or flanged as at 11, these flanges forming a feather for the blades.

The flat body portion of the spinner is fashioned with a diamond shaped opening 12 along the longitudinal central line of the lure, and beads 13, which may be of varied colors, are strung on the stem 1 and occupy space in the opening for both ornamental and utilitarian purposes.

In Figures 2 and 6 a slightly modified form of lure is shown, having the two thicknesses or layers of material in the spinner which is fashioned from a single sheet of metal to form the base plate 14. The metal is folded or bent along the line or edge 14' and the top plate 15 is pressed flat against the base plate as best shown in Figure 6. At 16 an overhanging flange is formed on the base plate and the flange is pressed down over the edge of the top plate 15 to securely hold the two plates together. These plates of the same material may be polished and of the same hue, or they may be provided with contrasting colors of paint or other material, as desired.

Having thus fully described my invention, what I claim as new and desire to secure by Letters Patent is:

1. In a fish lure, the combination with a stem, of a substantially diamond shaped spinner having a central opening therein and a pair of screw-blades at its rear portion, said spinner comprising a pair of plates of materials having contrasting colors, one of said plates having overhanging retaining flanges engaging the other plate, and said blades having, at their extremities, feathering edges for the purpose described.

2. In a fish lure the combination with a stem, of a substantially diamond shaped spinner fashioned from two flat plates of material having contrasting colors, one of the plates having edge flanges to overlap the other plate, a pair of opposed, perpendicular screw-blades fashioned at the rear portion of the spinner, the edges of the blades being disposed at angles to the axis of the spinner, and the front edges of the blades forming substantial continuations of the front edges of the spinner.

In testimony whereof I affix my signature.

ALBIN ABRAHAMS.